(12) United States Patent
Davarpanah et al.

(10) Patent No.: US 12,535,506 B2
(45) Date of Patent: Jan. 27, 2026

(54) MEASURING DISSIPATION FACTOR OF VOLTAGE DIVIDER OF CAPACITOR VOLTAGE TRANSFORMERS

(71) Applicants: Mahdi Davarpanah, Tehran (IR); Pooria Allah Karami, Tehran (IR); Abbas Torkamani, Tehran (IR); Vahid Hajihasani, Tehran (IR); Hossein Dadashi Ilkhechi, Tehran (IR)

(72) Inventors: Mahdi Davarpanah, Tehran (IR); Pooria Allah Karami, Tehran (IR); Abbas Torkamani, Tehran (IR); Vahid Hajihasani, Tehran (IR); Hossein Dadashi Ilkhechi, Tehran (IR)

(73) Assignee: Electronic Sazan Fan Aria Company (IR)

( * ) Notice: Subject to any disclaimer, the term of this patent is extended or adjusted under 35 U.S.C. 154(b) by 408 days.

(21) Appl. No.: 18/130,637

(22) Filed: Apr. 4, 2023

(65) Prior Publication Data
US 2023/0236224 A1 Jul. 27, 2023

Related U.S. Application Data

(60) Provisional application No. 63/326,921, filed on Apr. 4, 2022.

(51) Int. Cl.
*G01R 15/06* (2006.01)
*G01R 35/02* (2006.01)
*H02M 1/42* (2007.01)

(52) U.S. Cl.
CPC ............ *G01R 15/06* (2013.01); *G01R 35/02* (2013.01); *H02M 1/4225* (2013.01)

(58) Field of Classification Search
CPC ...... G01R 15/06; G01R 35/02; H02M 1/4225
See application file for complete search history.

(56) References Cited

U.S. PATENT DOCUMENTS

| 6,927,562 | B2* | 8/2005 | Anand | G01R 27/2688 |
| | | | | 324/126 |
| 2003/0160602 | A1* | 8/2003 | Anand | G01R 31/3271 |
| | | | | 324/126 |
| 2007/0046277 | A1* | 3/2007 | Namba | G01R 31/59 |
| | | | | 324/76.11 |
| 2009/0166811 | A1* | 7/2009 | Fujii | H01L 21/76898 |
| | | | | 257/E29.112 |
| 2014/0306671 | A1* | 10/2014 | Cawley | G01R 31/31721 |
| | | | | 323/265 |
| 2016/0202303 | A1* | 7/2016 | Costa i Bricha | G01R 31/58 |
| | | | | 702/58 |

* cited by examiner

*Primary Examiner* — Huy Q Phan
*Assistant Examiner* — Temilade S Rhodes-Vivour

(57) ABSTRACT

A method for measuring a dissipation factor of a voltage divider of a capacitor voltage transformer (CVT). The CVT includes a capacitor voltage divider (CVD), an intermediate voltage transformer (IVT), and a compensating reactor (CR). The CR is connected between the CVD and the IVT. The method includes measuring a grounded specimen test (GST) mode current that passes through a first capacitor of the CVD by coupling the current sensor in series with the first capacitor, measuring an ungrounded specimen test (UST) mode current that passes through a second capacitor of the CVD by coupling the current sensor in series with the second capacitor, and obtaining a dissipation factor of the CVD based on the GST mode current and the UST mode current.

13 Claims, 14 Drawing Sheets

300D

MEASURING DISSIPATION FACTOR OF VOLTAGE DIVIDER OF CAPACITOR VOLTAGE TRANSFORMERS

CROSS-REFERENCE TO RELATED APPLICATION

This application claims the benefit of priority from U.S. Provisional Patent Application Ser. No. 63/326,921 filed on Apr. 4, 2022, and entitled "MEASURING VOLTAGE DIVIDER DISSIPATION FACTOR OF CAPACITOR VOLTAGE TRANSFORMERS", which is incorporated herein by reference in its entirety.

TECHNICAL FIELD

The present disclosure generally relates to high voltage substation equipment, and particularly, to capacitor voltage transformers.

BACKGROUND

Voltage transformers (VTs) are special step-down transformers with a limited voltage ratio error and phase displacement between primary and secondary-side voltages. Under normal operation conditions, protection relays, controllers, and meters may be connected to VT secondary-side windings to measure voltage usually between about 50 and 120 volts. Meanwhile, for voltage levels equal to and greater than about 63 kV, capacitor voltage transformers (CVTs) are more common than other types of VTs. CVTs utilize a capacitor voltage dividers (CVDs) connected between phase and ground nodes to decrease voltage level. CVTs also employ intermediate voltage transformers (IVT) for further voltage reduction to a level appropriate for protection, control, and metering functions. CVTs exploit compensating reactors (CRs) to reduce CVT ratio errors, and particularly CVT phase displacement.

Dissipation factor, also known as tan δ, relates to dielectric losses in electrical insulation of equipment when operated in an AC power system. One of defined routine tests of CVTs is to measure dissipation factors of CVDs. A CVD dissipation factor may be easily measured during a manufacturing process of a CVT before mounting the CVD on remaining CVT parts. However, it may be necessary to measure a CVD dissipation factor of a CVT under operation due to different reasons. Such reasons may include evaluating insulation condition of CVDs to verify well-being of CVDs. In addition, it may be required to investigate conditions of a faulty CVT (that is, a CVT with a ratio error beyond a standard acceptable range). If a faulty CVT dissipation factor is small enough, it can be calibrated (that is, operated in a high voltage substation for few further years after an extra error compensation).

CVTs usually operate in high voltage substations that may not be equipped with a cleanroom. Therefore, disassembling CVTs may cause contaminations and humidity to enter into an intermediate voltage transformer (IVT) tank of CVTs. There is, therefore, a need for a method of measuring CVD dissipation factor of CVTs under operation without a need to disassemble CVTs while measurements are performed.

SUMMARY

This summary is intended to provide an overview of the subject matter of this patent, and is not intended to identify essential elements or key elements of the subject matter, nor is it intended to be used to determine the scope of the claimed implementations. The proper scope of this patent may be ascertained from the claims set forth below in view of the detailed description below and the drawings.

In one general aspect, the present disclosure describes an exemplary method for measuring dissipation factor of a capacitor voltage divider (CVD) of a capacitor voltage transformer (CVT). An exemplary CVT may include a CVD, an intermediate voltage transformer (IVT), and a compensating reactor (CR). An exemplary CR may be connected between the CVD and the IVT. An exemplary method may include measuring a grounded specimen test (GST) mode current that may pass through a first capacitor of the CVD by coupling the current sensor in series with the first capacitor, measuring an ungrounded specimen test (UST) mode current that may pass through a second capacitor of the CVD by coupling the current sensor in series with the second capacitor, and obtaining a dissipation factor of the CVD based on the GST mode current and the UST mode current.

In an exemplary embodiment, measuring the GST mode current may include coupling a high voltage terminal of the first capacitor to an AC voltage source, connecting the current sensor between the AC voltage source and a ground node, connecting a low voltage terminal of the second capacitor to the ground node, and recording a phasor value of the GST mode current at the current sensor. In an exemplary embodiment, measuring the UST mode current may include connecting the AC voltage source between the high voltage terminal and the ground node, decoupling the low voltage terminal from the ground node, connecting the current sensor between the low voltage terminal and the ground node, and recording a phasor value of the UST mode current at the current sensor.

In an exemplary embodiment, obtaining the dissipation factor of the CVD may include obtaining a GST mode capacitance and a GST mode dissipation factor from the GST mode current, obtaining a UST mode capacitance and a UST mode dissipation factor from the UST mode current, and calculating the dissipation factor of the CVD according to the GST mode capacitance, the GST mode dissipation factor, the UST mode capacitance, and the UST mode dissipation factor.

An exemplary method may further include obtaining a turn ratio of the IVT, obtaining a voltage ratio of the CVT, and calculating a capacitance ratio based on the turn ratio and the voltage ratio. In an exemplary embodiment, obtaining the turn ratio may include disconnecting the AC voltage source and the current sensor from the CVD, connecting the high voltage terminal to the low voltage terminal, applying an AC test voltage across terminals of secondary windings of the IVT, measuring a high voltage (HV)-side voltage of the IVT across the low voltage terminal and the ground node, and calculating the turn ratio according to values of the AC test voltage and the low voltage. In an exemplary embodiment, obtaining the voltage ratio may include disconnecting the AC voltage source and the current sensor from the CVD, connecting the low voltage terminal to the ground node, applying an AC test voltage to the high voltage terminal, measuring a secondary voltage across terminals of secondary windings of the IVT, and calculating the voltage ratio according to values of the AC test voltage and the secondary voltage.

Other exemplary systems, methods, features and advantages of the implementations will be, or will become, apparent to one of ordinary skill in the art upon examination of the following figures and detailed description. It is intended that all such additional systems, methods, features and advantages be included within this description and this summary, be within the scope of the implementations, and be protected by the claims herein.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be readily apparent to one skilled in the art, and the general principles defined herein may be applied to other implementations and applications without departing from the scope of the present disclosure. The present disclosure is not intended to be limited to the implementations shown, but is to be accorded the widest possible scope consistent with the principles and features disclosed herein.

Herein is disclosed an exemplary method for measuring dissipation factor of a voltage divider of a capacitor voltage transformer (CVT). An exemplary method may include different tests that may be performed on the CVT to obtain a dissipation factor of an exemplary capacitor voltage divider (CVD). Exemplary tests may include performing a grounded specimen test (GST) on an exemplary CVT to obtain a GST mode current that may pass through an exemplary CVD of the CVT and performing an ungrounded specimen test (UST) on an exemplary CVT to obtain a UST mode current that may pass through an exemplary CVD. Exemplary tests may further include obtaining a turn ratio of an exemplary intermediate voltage transformer (IVT) of the CVT and obtaining a voltage ratio of the CVT. Exemplary values of the turn ratio and the voltage ratio may be used to obtain a capacitance ratio of the CVD. Based on the capacitance ratio, the GST mode current, and the UST mode current, an exemplary dissipation factor of the CVD may be calculated. As a result, the dissipation factor of an exemplary CVD may be obtained without a need for disassembling the CVT. An exemplary method may also be applied for estimating dissipation factors of CVDs in any power system with a similar structure to CVTs, such as capacitive-coupling substations.

Figure 1A:
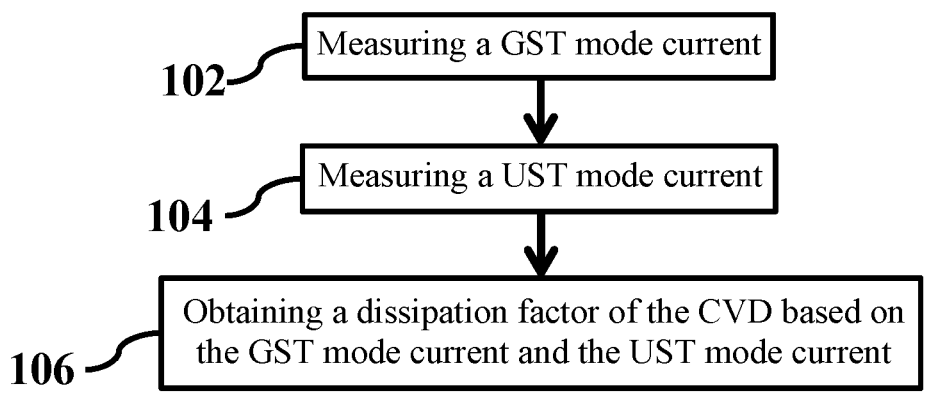
FIG. 1A shows a flowchart of a method for measuring a dissipation factor of a voltage divider of a capacitor voltage transformer (CVT), consistent with one or more exemplary embodiments of the present disclosure.

FIG. 1A shows a flowchart of a method for measuring dissipation factor of a voltage divider of a CVT, consistent with one or more exemplary embodiments of the present disclosure. An exemplary CVT may include a CVD, an IVT, and a compensating reactor (CR). An exemplary method 100 may include measuring a GST mode current (step 102), measuring a UST mode current (step 104), and obtaining a dissipation factor of the CVD based on the GST mode current and the UST mode current (step 106).

Figure 2A:
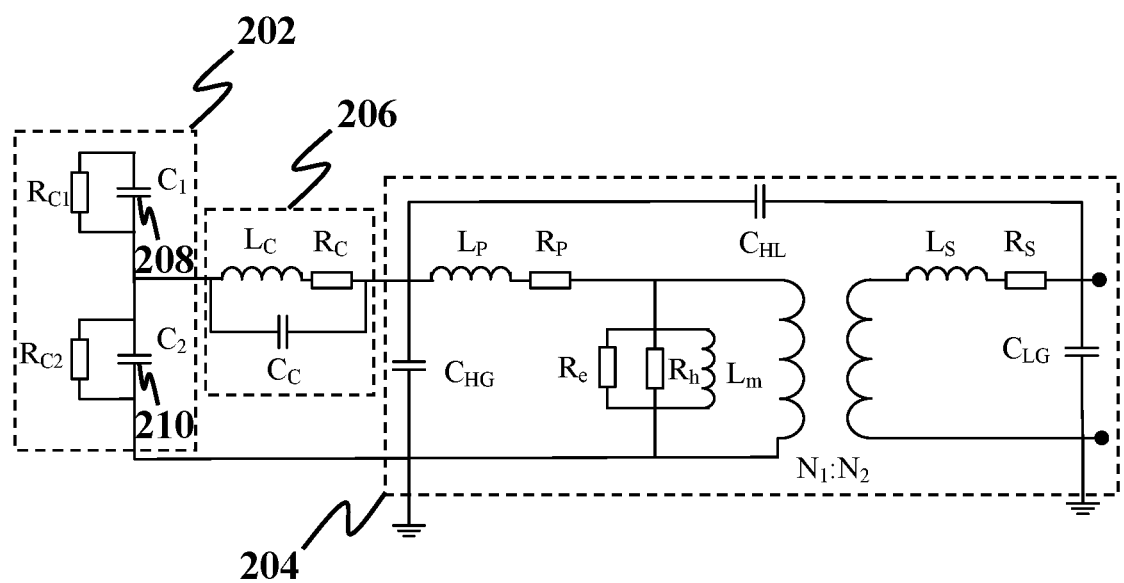
FIG. 2A shows a schematic of an equivalent circuit of a CVT, consistent with one or more exemplary embodiments of the present disclosure.

FIG. 2A shows a schematic of an equivalent circuit of a CVT, consistent with one or more exemplary embodiments of the present disclosure. An exemplary CVT 200A may include a CVD 202, an IVT 204, and a CR 206. In an exemplary embodiment, CR 206 may be connected between CVD 202 and IVT 204. In an exemplary embodiment, CVD 202 may include a first capacitor 208 and a second capacitor 210. Exemplary insulation losses of capacitors in CVD 202 are represented in FIG. 2A by parallel resistances of capacitor 208 and second capacitor 210. In an exemplary embodiment, different steps of method 100 may be implemented on CVT 200A.

Figure 1B:
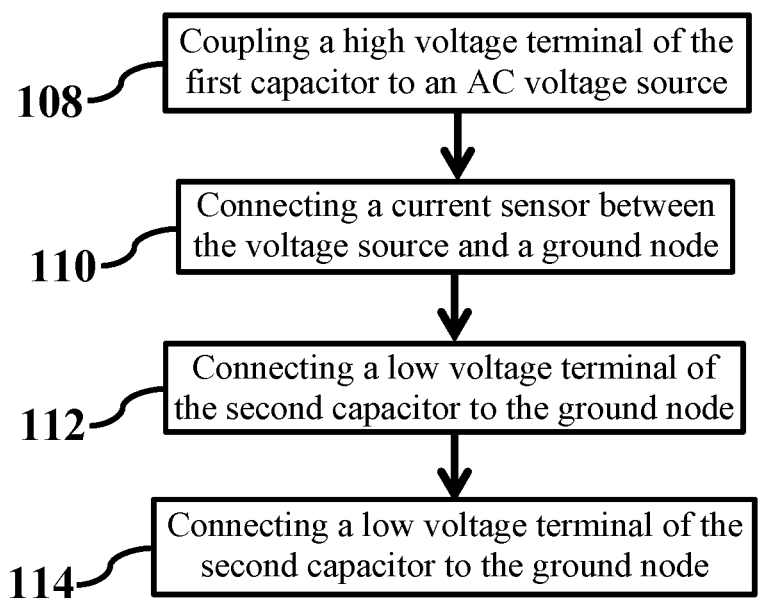
FIG. 1B shows a flowchart of a method for measuring a grounded specimen test (GST) mode current, consistent with one or more exemplary embodiments of the present disclosure.

Referring to FIGS. 1A and 2A, in an exemplary embodiment, step 102 may include measuring the GST mode current by coupling a current sensor in series with first capacitor 208. In further detail with respect to step 102, FIG. 1B shows a flowchart of a method for measuring a GST mode current, consistent with one or more exemplary embodiments of the present disclosure. In an exemplary embodiment, step 102 may include coupling a high voltage terminal of the first capacitor to an AC voltage source (step 108), connecting a current sensor between the AC voltage source and a ground node (step 110), connecting a low voltage terminal of the second capacitor to the ground node (step 112), and recording a phasor value of the GST mode current at the current sensor (step 114).

Figure 3A:
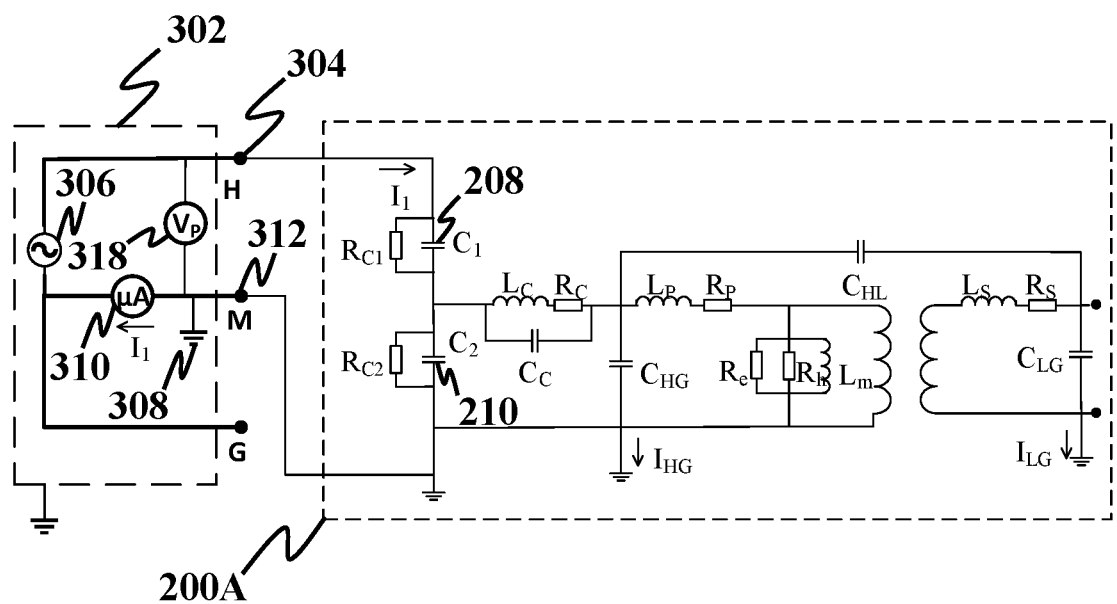
FIG. 3A shows a schematic of a first setup for measuring a GST mode current of a CVT, consistent with one or more exemplary embodiments of the present disclosure.

FIG. 3A shows a schematic of a first setup for measuring a GST mode current of a CVT, consistent with one or more exemplary embodiments of the present disclosure. An exemplary first setup 300A may include a dissipation factor (DF) test device 302 that may be coupled to CVT 200A and may be set to a GST test mode. In an exemplary embodiment, different steps of flowchart 102 of FIG. 1B may be implemented utilizing first setup 300A to measure a GST mode current $I_1$. In an exemplary embodiment, GST mode current $I_1$ may pass through first capacitor 208.

Referring to FIGS. 1B and 3A, in an exemplary embodiment, step 108 may include coupling a high voltage terminal 304 of first capacitor 208 to an AC voltage source 306. In an exemplary embodiment, "coupling" high voltage terminal 304 to AC voltage source 306 may refer to providing an electrical connection between high voltage terminal 304 and AC voltage source 306. For this purpose, an exemplary high voltage probe H of DF test device 302 may be wired to high voltage terminal 304. In an exemplary embodiment, AC voltage source 306 may be placed between high voltage terminal 304 and a ground node 308 and a high voltage end of AC voltage source 306 may be connected to high voltage terminal 304. As a result, an exemplary AC voltage may be applied to high voltage terminal 304. In an exemplary embodiment, AC voltage source 306 may have adjustable voltage amplitude and frequency.

In an exemplary embodiment, step 110 may include connecting a current sensor 310 between AC voltage source 306 and ground node 308. As a result, in an exemplary embodiment, current sensor 310 may be coupled in series with first capacitor 208. Therefore, in an exemplary embodiment, GST mode current $I_1$ may pass through current sensor 310.

In an exemplary embodiment, step 112 may include connecting a low voltage terminal 312 of second capacitor 210 to ground node 308. For this purpose, an exemplary measuring probe M of DF test device 302 may be wired to both low voltage terminal 312 and ground node 308.

In an exemplary embodiment, step 114 may include recording a phasor value of GST mode current $I_1$ at current sensor 310. For this purpose, an exemplary processor may be coupled with current sensor 310 to receive and store values of electric current that may be measured by current sensor 310.

Figure 1C:
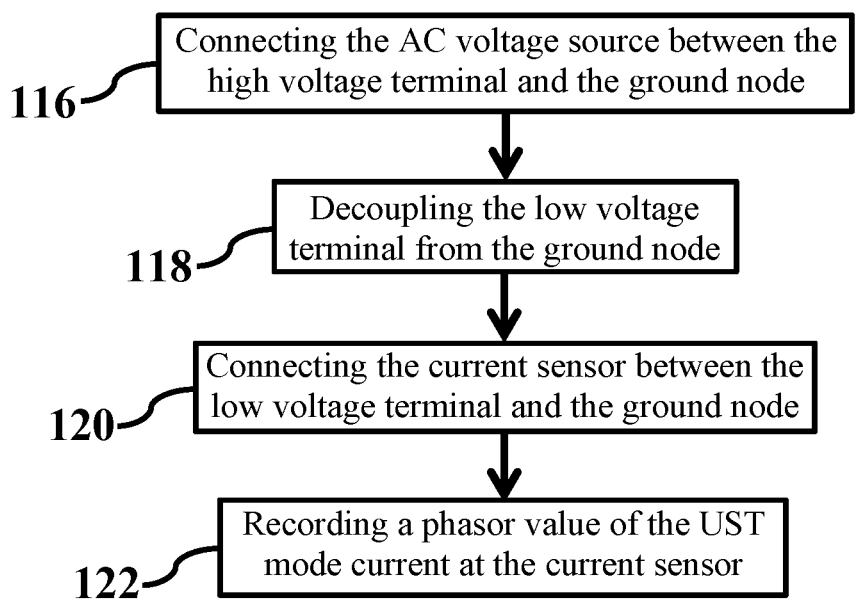
FIG. 1C shows a flowchart of a method for measuring an ungrounded specimen test (UST) mode current, consistent with one or more exemplary embodiments of the present disclosure.

Referring again to FIGS. 1A and 2A, in an exemplary embodiment, step 104 may include measuring the UST mode current by coupling the current sensor in series with second capacitor 210. In further detail with respect to step 104, FIG. 1C shows a flowchart of a method for measuring a UST mode current, consistent with one or more exemplary embodiments of the present disclosure. In an exemplary embodiment, step 104 may include connecting the AC voltage source between the high voltage terminal and the ground node (step 116), decoupling the low voltage terminal from the ground node (step 118), connecting the current sensor between the low voltage terminal and the ground node (step 120), and recording a phasor value of the UST mode current at the current sensor (step 122).

Figure 3B:
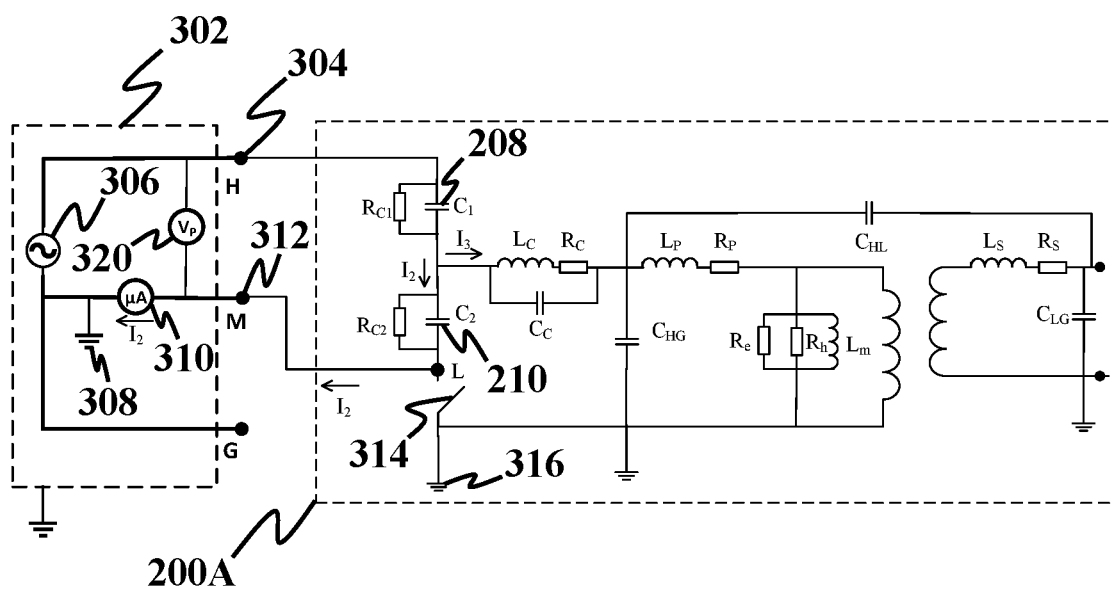
FIG. 3B shows a schematic of a second setup for measuring a UST mode current of a CVT, consistent with one or more exemplary embodiments of the present disclosure.

FIG. 3B shows a schematic of a second setup for measuring a UST mode current of a CVT, consistent with one or more exemplary embodiments of the present disclosure. An exemplary second setup 300B may include DF test device 302 that may be coupled to CVT 200A and may be set to a UST test mode. In an exemplary embodiment, different steps of flowchart 104 of FIG. 1C may be implemented utilizing second setup 300B to measure a UST mode current $I_2$. In an exemplary embodiment, UST mode current $I_2$ may pass through second capacitor 210.

Referring to FIGS. 1C and 3B, in an exemplary embodiment, step 116 may include connecting AC voltage source 306 between high voltage terminal 304 and ground node 308. For this purpose, in an exemplary embodiment, high voltage probe H of DF test device 302 may be wired to both high voltage terminal 304 and a high voltage end of AC voltage source 306. Moreover, an exemplary low voltage end of AC voltage source 306 may be connected to ground node 308. As a result, an exemplary AC voltage may be applied to high voltage terminal 304 (i.e., in an exemplary embodiment, between high voltage terminal 304 and ground node 308).

In an exemplary embodiment, step 118 may include decoupling low voltage terminal 312 from the ground node. For this purpose, an exemplary switch 314 may be opened to disconnect low voltage terminal 312 from a ground node 316. In an exemplary embodiment, ground node 316 may have a same electric potential as ground node 308.

In an exemplary embodiment, step 120 may include connecting current sensor 310 between low voltage terminal 312 and the ground node 308. For this purpose, measuring probe M of DF test device 302 may be wired to both current sensor 310 and low voltage terminal 312. As a result, in an exemplary embodiment, current sensor 310 may be coupled in series with second capacitor 210. Therefore, in an exemplary embodiment, UST mode current $I_2$ may pass through current sensor 310.

In an exemplary embodiment, step 122 may include recording a phasor value of UST mode current $I_2$ at current sensor 310. For this purpose, an exemplary processor may be coupled with current sensor 310 to receive and store values of electric current that may be measured by current sensor 310.

Figure 2B:
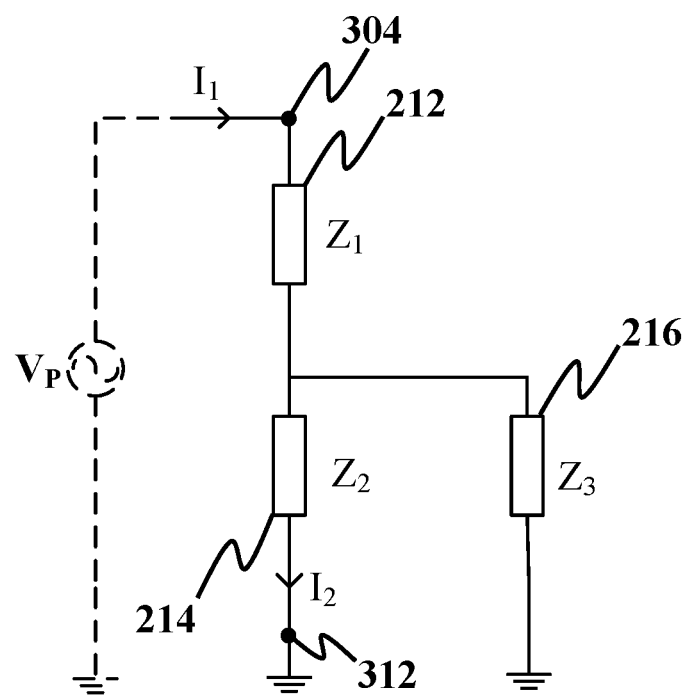
FIG. 2B shows a schematic of a simplified equivalent circuit of a CVT, consistent with one or more exemplary embodiments of the present disclosure.

Referring again to FIGS. 1A, 2A, 3A, and 3B, in an exemplary embodiment, step 106 may include obtaining the dissipation factor of CVD 202 based on GST mode current $I_1$ and UST mode current $I_2$. In further detail with respect to step 106, FIG. 2B shows a schematic of a simplified equivalent circuit of a CVT, consistent with one or more exemplary embodiments of the present disclosure. An exemplary circuit 200B may include a simplified model of CVT 200A. An exemplary first impedance 212 may be equivalent to first capacitor 208 and its insulation loss (modeled as a parallel resistance $R_{C1}$). An exemplary second impedance 214 may be equivalent to second capacitor 210 and its insulation loss (modeled as a parallel resistance $R_{C2}$). An exemplary third impedance 216 may be equivalent to the rest of CVT 200A including IVT 204 and CR 206. In an exemplary embodiment, circuit 200B may be utilized to derive the dissipation factor of CVD 202, as described below.

Since, in an exemplary embodiment, first capacitor 208 and second capacitor 210 may be designed and fabricated with a same material, methodology, and machine, and may usually experience same environmental conditions and electrical stresses under normal operation conditions, it may be assumed that dissipation factors of first capacitor 208 and second capacitor 210 may be identical. Therefore, an exemplary capacitance ratio may be defined for CVD 200A according to the following:

$$a = \frac{C_1}{C_2} = \frac{R_{C2}}{R_{C1}} = \frac{Z_2}{Z_1} \qquad \text{Equation (1)}$$

where $C_1$ is a capacitance of first capacitor 208, $C_2$ is a capacitance of second capacitor 210, $R_{C1}$ and $R_{C2}$ are parallel resistances with first capacitor 208 and second capacitor 210, respectively, to model their insulation losses, $Z_1$ is a value of first impedance 212, and $Z_2$ is a value of second impedance 214.

In an exemplary embodiment, internal resistance of current sensor 310 may be negligible. Therefore, an exemplary voltage drop across current sensor 310 may be ignored. As a result, an exemplary electric current passing through first impedance 212 may be approximately equal to GST mode current $I_1$ and an exemplary electric current passing through second impedance 214 may be approximately equal to UST mode current $I_2$. An exemplary voltage $V_p$ between high voltage terminal 304 and low voltage terminal 312 may be described as follows:

$$\overline{V}_p = \overline{Z}_1 \times \overline{I}_1 + \overline{Z}_2 \times \overline{I}_2 \qquad \text{Equation (2)}$$

where $\overline{V}_p$ is a phasor value of voltage $V_p$, $\overline{Z}_1$ is a phasor value of first impedance 212, $\overline{I}_1$ is a phasor value of GST mode current $I_1$, $\overline{Z}_2$ is a phasor value of second impedance 214, and $\overline{I}_2$ is a phasor value of UST mode current $I_2$.

Combination of Equations (1) and (2) results in the following:

$$\overline{V}_p = \overline{Z}_1 \times \overline{I}_{Eq} \qquad \text{Equation (3a)}$$

$$\overline{I}_{Eq} = \overline{I}_1 + a \times \overline{I}_2 \qquad \text{Equation (3b)}$$

In an exemplary embodiment, Equations (3a) and (3b) may be written for a loop that may consist of measured voltages across CVD 202, i.e., voltage $V_p$, first impedance 212, and second impedance 214, which belong to only CVD 202. Therefore, considering Equations (3a) and (3b), an exemplary dissipation factor of CVD 202 may be defined by the following:

$$\tan \delta_{CVD} = \frac{IR_{Eq}}{IC_{Eq}} \qquad \text{Equation (4)}$$

where $\tan \delta_{CVD}$ is the dissipation factor of CVD 202, $IR_{Eq}$ is a real part of $\overline{I}_{Eq}$, and $IC_{Eq}$ is an imaginary part of $\overline{I}_{Eq}$.

Based on Equations (3b) and (4), in an exemplary embodiment, the dissipation factor of CVD 202 may be calculated according to an operation defined by the following:

$$\tan \delta_{CVD} = \frac{IR_{GST} + a \times IR_{UST}}{IC_{GST} + a \times IC_{UST}} \qquad \text{Equation (5)}$$

where $IR_{GST}$ is a real part of GST mode current $I_1$ phasor value, $IR_{UST}$ is a real part of UST mode current $I_2$ phasor value, $IC_{GST}$ is an imaginary part of GST mode current $I_1$ phasor value, and $IC_{UST}$ is an imaginary part of UST mode current $I_2$ phasor value. In an exemplary embodiment, all exemplary calculations utilizing exemplary equations in the present disclosure may be conducted by one or more processors, similar to an exemplary processor of computing system 400 described in FIG. 4 further below.

In an exemplary embodiment, to obtain phasor values of GST mode current $I_1$ and UST mode current $I_2$, initial phase angles and amplitudes of each current and a corresponding phase angle of voltage $V_p$ may be calculated from measured values, for example, by applying a discrete Fourier transform (DFT) to each phasor value. Exemplary initial phase angles may then be compensated according to the phase angle of voltage $V_p$. For example, if a phasor value of voltage $V_p$ under a GST test mode is $\overline{V}_p = V_{test} \angle \varphi_{Vtest}$ and an initial phasor value of GST mode current $I_1$ is $\overline{I}_{1,initial} = I_1 \angle \varphi_{I1}$, a compensated phasor value of GST mode current $I_1$ may be $\overline{I}_1 = I_1 \angle (\varphi_{I1} - \varphi_{Vtest})$.

Figure 1D:
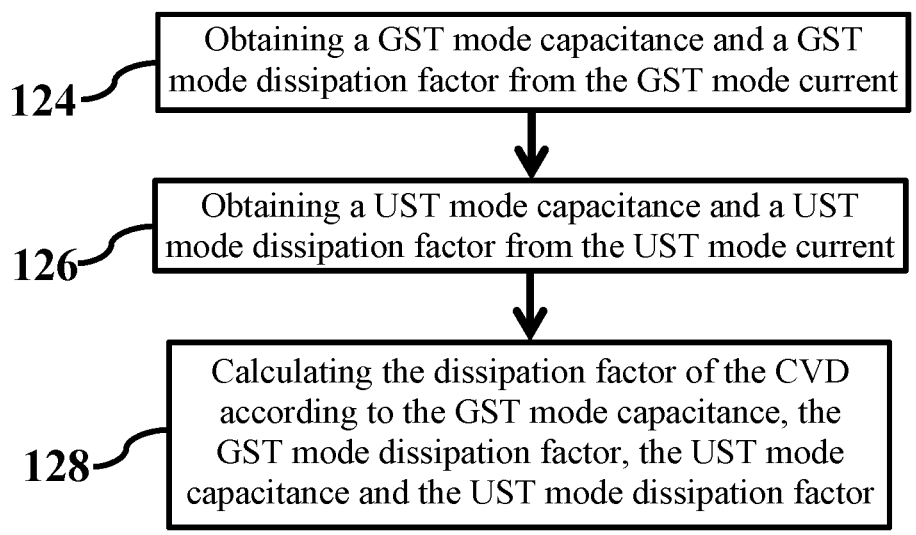
FIG. 1D shows a flowchart of a method for obtaining a dissipation factor of a capacitor voltage divider (CVD), consistent with one or more exemplary embodiments of the present disclosure.

FIG. 1D shows a flowchart of a method for obtaining a dissipation factor of a CVD, consistent with one or more exemplary embodiments of the present disclosure. In an exemplary embodiment, obtaining the dissipation factor of CVD 202 in step 106 may include obtaining a GST mode capacitance and a GST mode dissipation factor from the GST mode current (step 124), obtaining a UST mode capacitance and a UST mode dissipation factor from the UST mode current (step 126), and calculating the dissipation factor of the CVD according to the GST mode capacitance, the GST mode dissipation factor, the UST mode capacitance, and the UST mode dissipation factor (step 128).

In an exemplary embodiment, step 124 may include obtaining the GST mode capacitance and the GST mode dissipation factor from GST mode current $I_1$. In an exemplary embodiment, DF test device 302 may include a tan δ module that is capable of deriving the GST mode capacitance and the GST mode dissipation factor from GST mode current $I_1$.

In further detail with respect to step 124, to obtain the GST mode capacitance and the GST mode dissipation factor, an exemplary voltage $V_p$ between high voltage terminal 304 and low voltage terminal 312 may be measured by connecting an exemplary voltage sensor 318 (shown in FIG. 3A) between high voltage terminal 304 and low voltage terminal 312. In an exemplary embodiment, a processor may be coupled with voltage sensor 318 to receive and store voltage values that may be measured by voltage sensor 318.

In an exemplary embodiment, the GST mode capacitance may be calculated according to an operation defined by the following:

$$C_{GST} = \frac{IC_{GST}}{\omega \times V_p} \qquad \text{Equation (6)}$$

where $C_{GST}$ is the GST mode capacitance and ω is an angular frequency of voltage $V_p$.

In an exemplary embodiment, the GST mode dissipation factor may be calculated according to an operation defined by the following:

$$\tan \delta_{GST} = \frac{IR_{GST}}{IC_{GST}} \qquad \text{Equation (7)}$$

where $\tan \delta_{GST}$ is the GST mode dissipation factor.

Referring again to FIGS. 1D and 3B, in an exemplary embodiment, step 126 may include obtaining the UST mode capacitance and the UST mode dissipation factor from UST mode current I₂. In an exemplary embodiment, DF test device 302 may include a tan δ module that is capable of deriving the UST mode capacitance and the UST mode dissipation factor from UST mode current I₂.

In further detail with respect to step 126, to obtain the UST mode capacitance and the UST mode dissipation factor, an exemplary voltage $V_p$ between high voltage terminal 304 and low voltage terminal 312 may be measured by connecting an exemplary voltage sensor 320 between high voltage terminal 304 and low voltage terminal 312. In an exemplary embodiment, a processor may be coupled with voltage sensor 320 to receive and store voltage values that may be measured by voltage sensor 320.

In an exemplary embodiment, the UST mode capacitance may be calculated according to an operation defined by the following:

$$C_{UST} = \frac{IC_{UST}}{\omega \times V_p} \qquad \text{Equation (8)}$$

where $C_{UST}$ is the UST mode capacitance and a is an angular frequency of voltage $V_p$.

In an exemplary embodiment, the UST mode dissipation factor may be calculated according to an operation defined by the following:

$$\tan \delta_{UST} = \frac{IR_{UST}}{IC_{UST}} \qquad \text{Equation (9)}$$

where $\tan \delta_{UST}$ is the UST mode dissipation factor.

In an exemplary embodiment, step 128 may include calculating the dissipation factor of CVD 202. By rephrasing Equation (5) according to Equations (6)-(9), an exemplary dissipation factor of CVD 202 may be calculated according to an operation defined by the following:

$$\tan \delta_{CVD} = \frac{C_{GST} \times \tan \delta_{GST} + a \times C_{UST} \times \tan \delta_{UST}}{C_{GST} + a \times C_{UST}} \qquad \text{Equation (10)}$$

Accordingly, by using DF test results of CVT 200A under UST and GST modes, an exemplary dissipation factor of CVD 202 may be calculated. In an exemplary embodiment, capacitance ratio a may also be attained based on two tests described below.

Figure 1E:
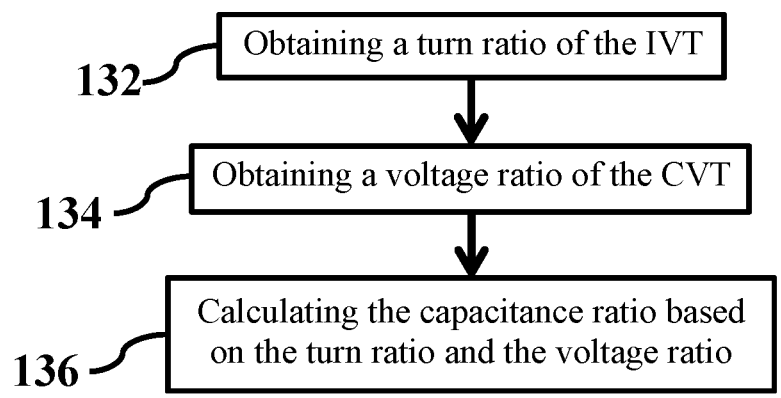
FIG. 1E shows a flowchart of a method for obtaining a capacitance ratio, consistent with one or more exemplary embodiments of the present disclosure.

In an exemplary embodiment, method 100 may further include obtaining capacitance ratio a. FIG. 1E shows a flowchart of a method for obtaining a capacitance ratio, consistent with one or more exemplary embodiments of the present disclosure. An exemplary method 130 may include obtaining a turn ratio of the IVT (step 132), obtaining a voltage ratio of the CVT (step 134), and calculating the capacitance ratio based on the turn ratio and the voltage ratio (step 136).

Figure 1F:
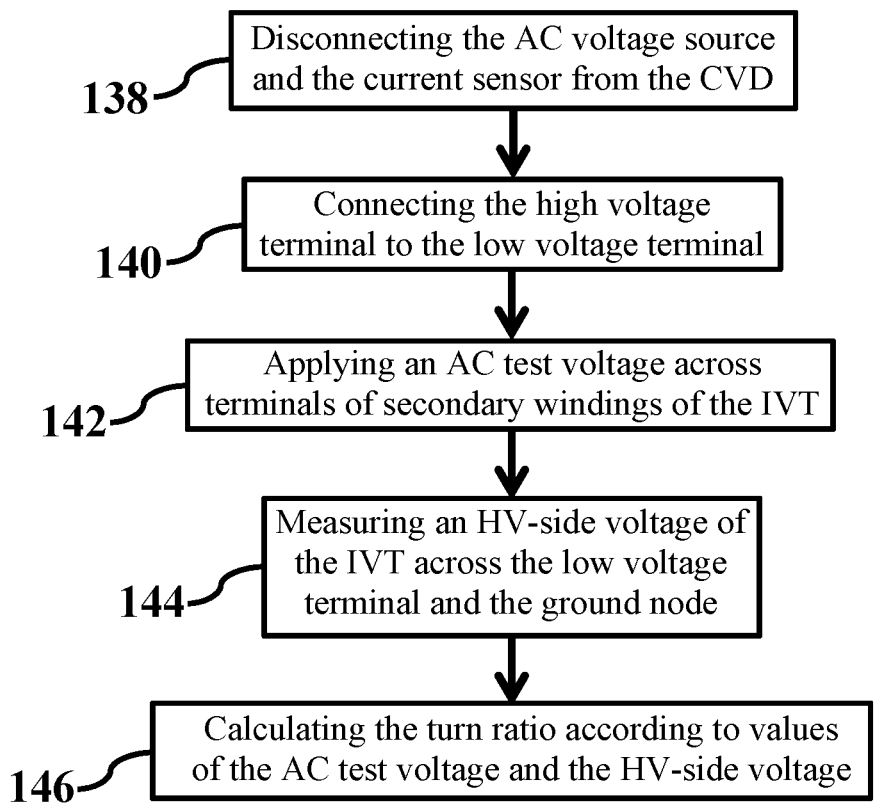
FIG. 1F shows a flowchart for obtaining a turn ratio of an intermediate voltage transformer (IVT), consistent with one or more exemplary embodiments of the present disclosure.

In further detail with respect to step 132, FIG. 1F shows a flowchart for obtaining a turn ratio of an IVT, consistent with one or more exemplary embodiments of the present disclosure. In an exemplary embodiment, step 132 may include disconnecting the AC voltage source and the current sensor from the CVD (step 138), connecting the high voltage terminal to the low voltage terminal (step 140), applying an AC test voltage across terminals of secondary windings of the IVT (step 142), measuring a high voltage (HV)-side voltage of the IVT across the low voltage terminal and the ground node (step 144), and calculating the turn ratio according to values of the AC test voltage and the HV-side voltage (step 146).

Figure 3C:
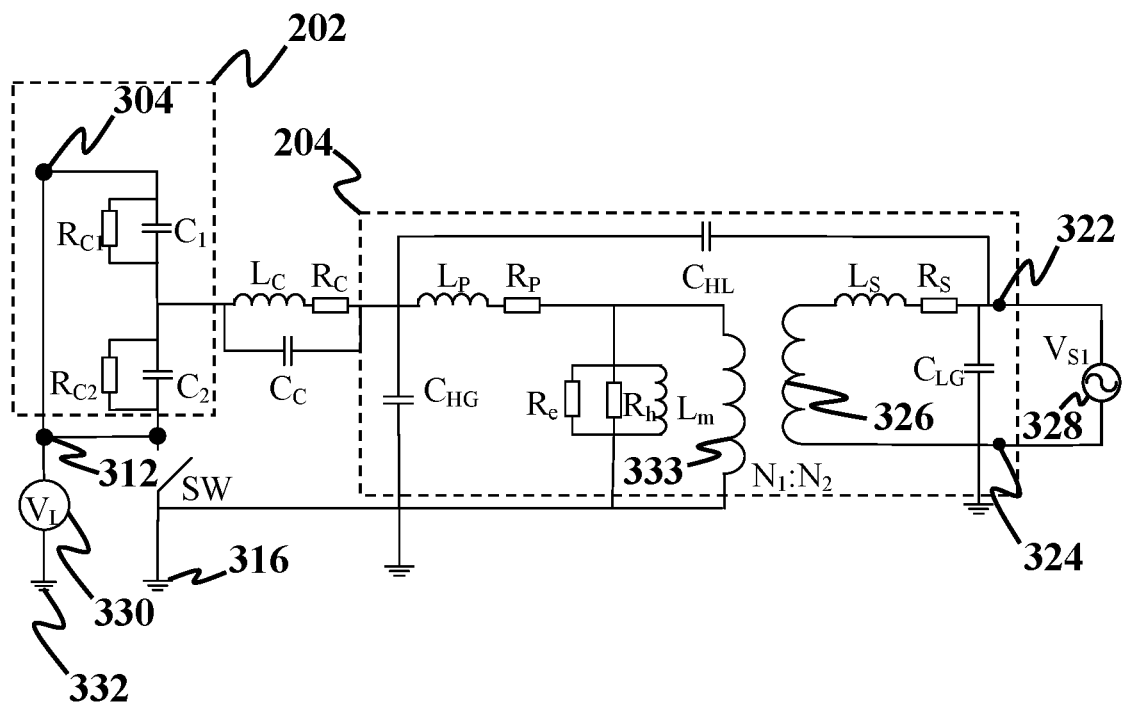
FIG. 3C shows a schematic of a third setup for obtaining a turn ratio of an IVT, consistent with one or more exemplary embodiments of the present disclosure.

FIG. 3C shows a schematic of a third setup for obtaining a turn ratio of an IVT, consistent with one or more exemplary embodiments of the present disclosure. In an exemplary embodiment, different steps of flowchart 132 of FIG. 1F may be implemented utilizing a third setup 300C to obtain a turn ratio of IVT 204.

Referring to FIGS. 1F, 3B, and 3C, in an exemplary embodiment, step 138 may include disconnecting AC voltage source 306 and current sensor 310 from CVD 202. For this purpose, in an exemplary embodiment, AC voltage source 306 and current sensor 310 may be removed from third setup 300C.

In an exemplary embodiment, step 140 may include connecting high voltage terminal 304 to low voltage terminal 312. For this purpose, in an exemplary embodiment, high voltage terminal 304 may be wired to low voltage terminal 312.

In an exemplary embodiment, step 142 may include applying an AC test voltage across terminals 322 and 324 of secondary windings 326 of IVT 204. An exemplary AC voltage source 328 may be connected between terminals 322 and 324 to apply the AC test voltage across terminals 322 and 324.

In an exemplary embodiment, step 144 may include measuring an HV-side voltage of IVT 204 across low voltage terminal 312 and the ground node. For this purpose, an exemplary voltage sensor 330 may be connected between low voltage terminal 312 and a ground node 332. In an exemplary embodiment, ground node 332 may have a same electric potential as ground node 316. An exemplary processor may be coupled with voltage sensor 330 to receive and store voltage values that may be measured by voltage sensor 330.

For further detail with regards to step 146, in an exemplary embodiment, the turn ratio of IVT 204 may be calculated according to an operation defined by the following:

$$TR_{IVT} = \frac{N_2}{N_1} = \frac{V_{S1}}{V_{HV}} \qquad \text{Equation (11)}$$

where $TR_{IVT}$ is the turn ratio, $N_2$ is a number of turns of secondary windings 326 of IVT 204, $N_1$ is a number of turns of primary windings 333 of IVT 204, $V_{S1}$ is the AC test voltage across terminals 322 and 324, and $V_{HV}$ is the HV-side voltage of IVT 204.

Figure 1G:
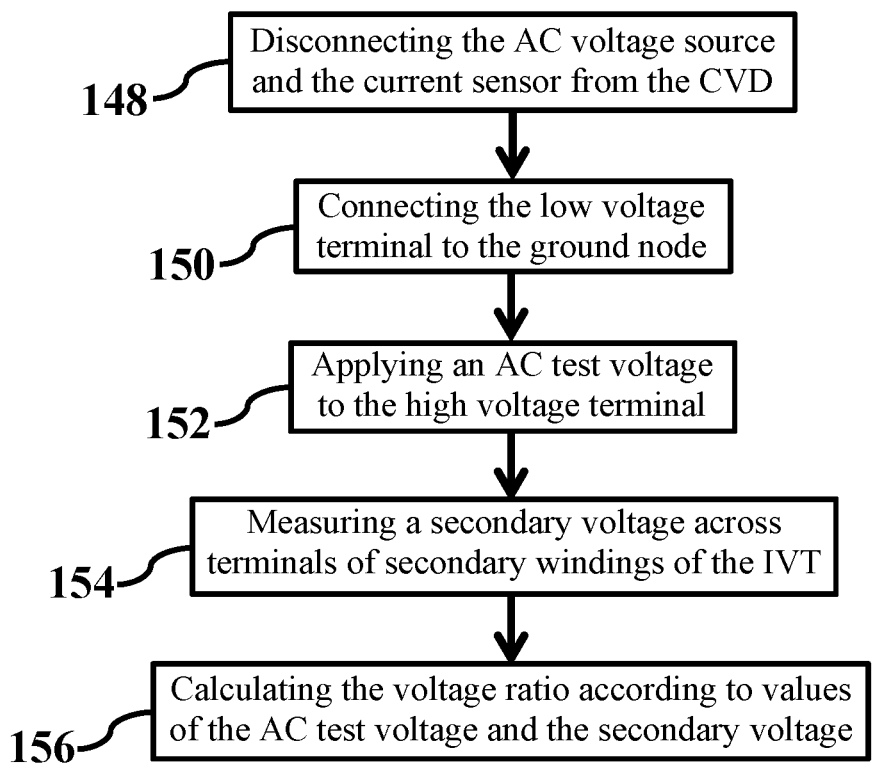
FIG. 1G shows a flowchart for obtaining a voltage ratio of a CVT, consistent with one or more exemplary embodiments of the present disclosure.

Referring again to FIGS. 1E and 2A, in an exemplary embodiment, step 134 may include obtaining a voltage ratio of CVT 200A. FIG. 1G shows a flowchart for obtaining a voltage ratio of a CVT, consistent with one or more exemplary embodiments of the present disclosure. In an exemplary embodiment, step 134 may include disconnecting the AC voltage source and the current sensor from the CVD (step 148), connecting the low voltage terminal to the ground node (step 150), applying an AC test voltage to the high voltage terminal (step 152), measuring a secondary voltage across terminals of secondary windings of the IVT (step 154), and calculating the voltage ratio according to values of the AC test voltage and the secondary voltage (step 156).

Figure 3D:
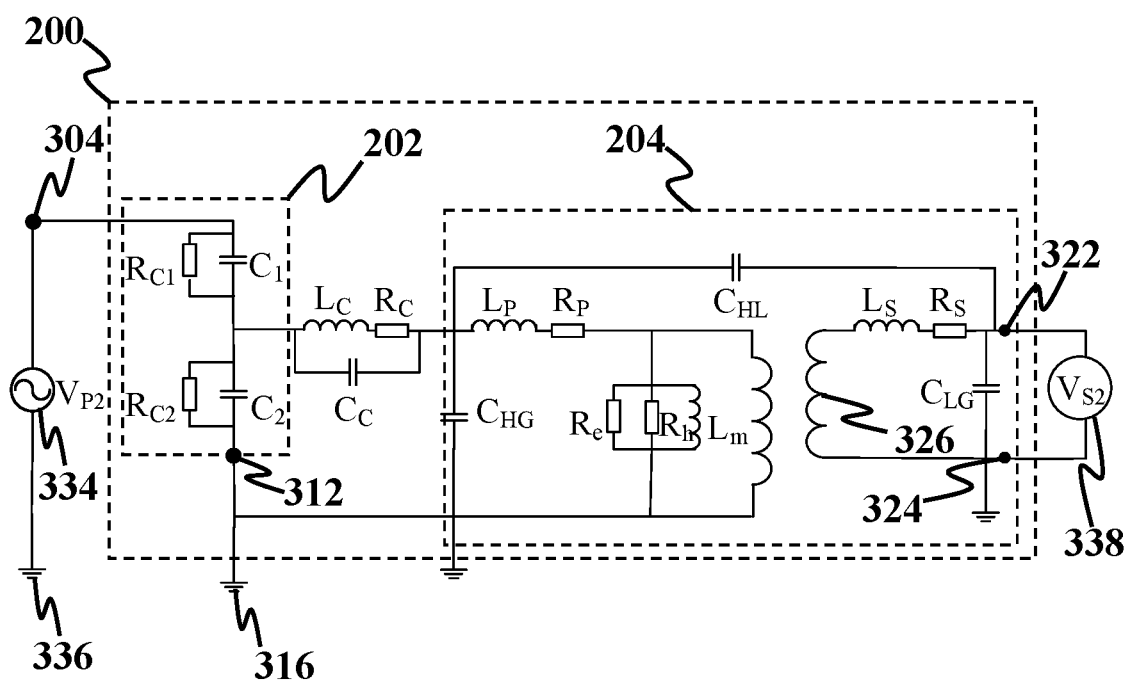
FIG. 3D shows a schematic of a fourth setup for obtaining a voltage ratio of a CVT, consistent with one or more exemplary embodiments of the present disclosure.

FIG. 3D shows a schematic of a fourth setup for obtaining a voltage ratio of a CVT, consistent with one or more exemplary embodiments of the present disclosure. In an exemplary embodiment, different steps of flowchart 134 of FIG. 1G may be implemented utilizing a fourth setup 300D to obtain the turn ratio of CVT 200A.

Referring to FIGS. 1G, 3B, and 3D, in an exemplary embodiment, step 148 may include disconnecting AC voltage source 306 and current sensor 310 from CVD 202. For this purpose, in an exemplary embodiment, AC voltage source 306 and current sensor 310 may be removed from fourth setup 300D.

In an exemplary embodiment, step 150 may include connecting low voltage terminal 312 to ground node 316. For this purpose, in an exemplary embodiment, switch 314 (shown in FIG. 3B) may be closed to connect low voltage terminal 312 to ground node 316.

In an exemplary embodiment, step 152 may include applying an AC test voltage to high voltage terminal 304. An exemplary AC voltage source 334 may be connected between high voltage terminal 304 and a ground node 336 to apply the AC test voltage to high voltage terminal 304.

In an exemplary embodiment, step 154 may include measuring a secondary voltage across terminals of secondary windings 326 of IVT 204. For this purpose, an exemplary voltage sensor 338 may be connected between terminals 322 and 324. An exemplary processor may be coupled with voltage sensor 338 to receive and store voltage values that may be measured by voltage sensor 338.

For further detail with regards to step 156, in an exemplary embodiment, the voltage ratio of CVT 200A may be calculated according to an operation defined by the following:

$$VR_{CVT} = \frac{V_{S2}}{V_{P2}} \qquad \text{Equation (12)}$$

where $VR_{CVT}$ is the voltage ratio, $V_{S2}$ is the secondary voltage across terminals 322 and 324, and $V_{P2}$ is the AC test voltage at high voltage terminal 304.

Referring again to FIG. 1E, in an exemplary embodiment, step 136 may include obtaining capacitance ratio a from turn ratio $TR_{IVT}$ and voltage ratio $VR_{CVT}$. In an exemplary embodiment, voltage ratio $VR_{CVT}$ and turn ratio $TR_{IVT}$ may relate to a voltage ratio $VR_{CVD}$ of CVD 202 according to an operation defined by the following:

$$VR_{CVD} = \frac{C_1}{C_1 + C_2} = \frac{a}{a+1} = \frac{VR_{CVT}}{TR_{IVT}} \qquad \text{Equation (13)}$$

Based on Equation (13), in an exemplary embodiment, capacitance ratio a may be obtained according to an operation defined by the following:

$$a = \frac{VR_{CVT}}{TR_{IVT} - VR_{CVT}} \qquad \text{Equation (14)}$$

Figure 4:
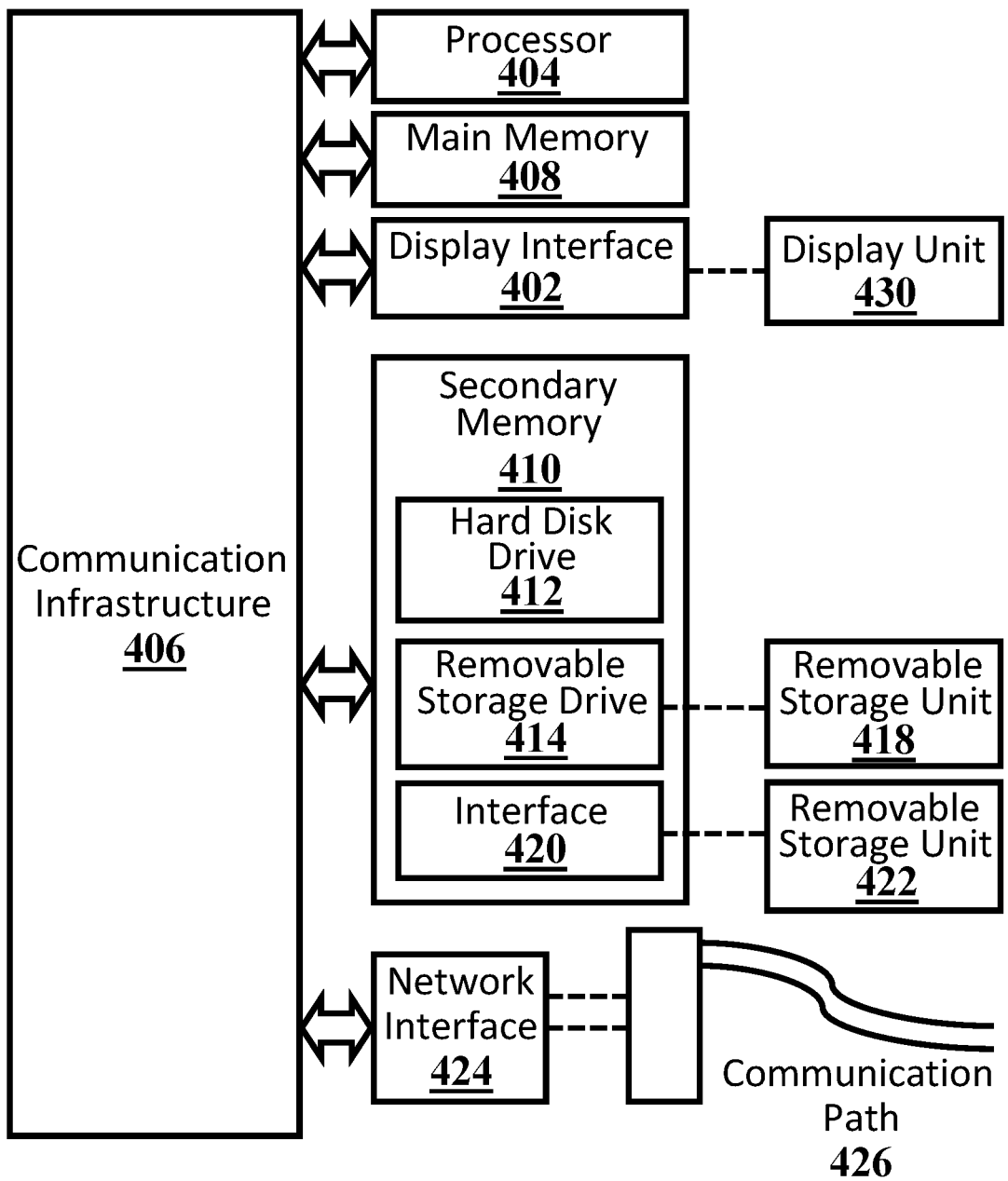
FIG. 4 shows a high-level functional block diagram of a computer system, consistent with one or more exemplary embodiments of the present disclosure.

FIG. 4 shows an example computer system 400 in which an embodiment of the present invention, or portions thereof, may be implemented as computer-readable code, consistent with exemplary embodiments of the present disclosure. For example, different steps of method 100 may be implemented in computer system 400 using hardware, software, firmware, tangible computer readable media having instructions stored thereon, or a combination thereof and may be implemented in one or more computer systems or other processing systems. Hardware, software, or any combination of such may embody any of the modules and components in FIGS. 1A-3D.

If programmable logic is used, such logic may execute on a commercially available processing platform or a special purpose device. One ordinary skill in the art may appreciate that an embodiment of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above-described embodiments. A processor device may be a single processor, a plurality of processors, or combinations thereof. Processor devices may have one or more processor "cores."

An embodiment of the invention is described in terms of this example computer system 400. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 404 may be a special purpose (e.g., a graphical processing unit) or a general-purpose processor device. As will be appreciated by persons skilled in the relevant art, processor device 404 may also be a single processor in a multi-core/multiprocessor system, such system operating alone, or in a cluster of computing devices operating in a cluster or server farm. Processor device 404 may be connected to a communication infrastructure 406, for example, a bus, message queue, network, or multi-core message-passing scheme.

In an exemplary embodiment, computer system 400 may include a display interface 402, for example a video connector, to transfer data to a display unit 430, for example, a monitor. Computer system 400 may also include a main memory 408, for example, random access memory (RAM), and may also include a secondary memory 410. Secondary memory 410 may include, for example, a hard disk drive 412, and a removable storage drive 414. Removable storage drive 414 may include a floppy disk drive, a magnetic tape drive, an optical disk drive, a flash memory, or the like. Removable storage drive 414 may read from and/or write to a removable storage unit 418 in a well-known manner. Removable storage unit 418 may include a floppy disk, a magnetic tape, an optical disk, etc., which may be read by and written to by removable storage drive 414. As will be appreciated by persons skilled in the relevant art, removable storage unit 418 may include a computer usable storage medium having stored therein computer software and/or data.

In alternative implementations, secondary memory 410 may include other similar means for allowing computer programs or other instructions to be loaded into computer system 400. Such means may include, for example, a removable storage unit 422 and an interface 420. Examples of such means may include a program cartridge and cartridge interface (such as that found in video game devices), a removable memory chip (such as an EPROM, or PROM) and associated socket, and other removable storage units 422 and interfaces 420 which allow software and data to be transferred from removable storage unit 422 to computer system 400.

Computer system 400 may also include a communications interface 424. Communications interface 424 allows software and data to be transferred between computer system 400 and external devices. Communications interface 424 may include a modem, a network interface (such as an Ethernet card), a communications port, a PCMCIA slot and card, or the like. Software and data transferred via communications interface 424 may be in the form of signals, which may be electronic, electromagnetic, optical, or other signals capable of being received by communications interface 424. These signals may be provided to communications interface 424 via a communications path 426. Communications path 426 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 418, removable storage unit 422, and a hard disk installed in hard disk drive 412. Computer program medium and computer usable medium may also refer to memories, such as main memory 408 and secondary memory 410, which may be memory semiconductors (e.g. DRAMs, etc.).

Computer programs (also called computer control logic) are stored in main memory 408 and/or secondary memory 410. Computer programs may also be received via communications interface 424. Such computer programs, when executed, enable computer system 400 to implement different embodiments of the present disclosure as discussed herein. In particular, the computer programs, when executed, enable processor device 404 to implement the processes of the present disclosure, such as the operations in method 100 illustrated by flowcharts of FIGS. 1A-FIG. 1G discussed above. Accordingly, such computer programs represent controllers of computer system 400. Where an exemplary embodiment of method 100 is implemented using software, the software may be stored in a computer program product and loaded into computer system 400 using removable storage drive 414, interface 420, and hard disk drive 412, or communications interface 424.

Embodiments of the present disclosure also may be directed to computer program products including software stored on any computer useable medium. Such software, when executed in one or more data processing device, causes a data processing device to operate as described herein. An embodiment of the present disclosure may employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

Example

In this example, performance of an exemplary method similar to method 100 for determining dissipation factor and capacitance values of a CVD similar to CVD 200A of FIG. 2A based on test results on the CVT is evaluated. Table 1 shows parameter values of an exemplary CVT. It is assumed that capacitances $C_1$ and $C_2$ have a same amount of DF. Table 2 shows results for various test modes along with an actual value of the CVD dissipation factor and capacitance. Comparison of test results with actual values reveals the DF resulted by both GST and UST test modes highly differs from the actual value (i.e., about 0.2% for an exemplary CVD under study). In other words, an exemplary IVT has such a high influence on test results that the measured CVT DF cannot be directly reported as the DF of the CVD.

TABLE 1

Parameter values of a CVT under study

| Parameter | Value |
|---|---|
| $C_1$ | 8.20 [nF] |
| $C_2$ | 73.30 [nF] |
| $R_{C1}$ | 194.09 [MΩ] |
| $R_{C2}$ | 21.713 [MΩ] |
| $L_C$ | 118.32 [H] |
| $R_C$ | 2784 [MΩ] |
| $C_C$ | 0.1 [nF] |
| $C_{HG}$ | 0.5 [nF] |
| $C_{HL}$ | 1.5 [nF] |
| $C_{LG}$ | 3 [nF] |
| $L_P$ | 3 [H] |
| $R_P$ | 1032 [ohm] |
| $L_S$ | 67.034 [μH] |
| $R_S$ | 0.064 [ohm] |
| $L_m$ | 26677 [H] |
| $R_h$ | 26.4 [MΩ] |
| $R_e$ | 10 [MΩ] |
| $N_1$ | 23059 |
| $N_2$ | 109 |

TABLE 2

Results of DF tests on an exemplary CVT under GST and UST test modes

| Dissipation Factor Test Mode | Test Results Capacitance (nF) | Dissipation Factor (%) |
|---|---|---|
| UST Mode Test on CVD (actual value) | 7.375 | 0.2 |
| GST Mode Test on CVT | 7.39 | 0.26 |
| UST Mode Test on CVT | 7.23 | −0.35 |

Table 3 shows results of an exemplary test for obtaining an IVT turn ratio utilizing an implantation of third setup 300C. To do so, a power frequency sinusoidal voltage of $V_{S1}$ was applied and voltage $V_{HV}$ was measured. Afterwards, $TR_{IVT}$ was calculated by Equation (11). Table 4 shows results of an exemplary test to obtain a CVD voltage ratio utilizing an implantation of fourth setup 300D. In this case, after applying a power frequency sinusoidal voltage of $V_{P_2}$ with an amplitude of about 2.2 kV, a secondary side voltage $V_{S2}$ was measured. Next, $VR_{CVT}$ and $VR_{CVD}$ were calculated by Equations (12) and (13), respectively. Based on the values shown in Tables 3 and 4, the capacitance ratio of an exemplary CVT was obtained according to Equation (14) as follows:

$$a = \frac{VR_{CVT}}{TR_{IVT} - VR_{CVT}} = \frac{0.0004749}{0.004726 - 0.0004749} = 0.1117$$

According to Equation (10), an exemplary CVD dissipation factor was obtained based on results in Table 2 and the calculated amount of capacitance ratio a as follows:

$$\tan\delta_{CVD} = \frac{C_{GST} \times \tan\delta_{GST} + a \times C_{UST} \times \tan\delta_{UST}}{C_{GST} + a \times C_{UST}}$$
$$= \frac{7.39 \times 0.26 + 0.1117 \times 7.23 \times (-0.35)}{7.39 + 0.1117 \times 7.23} = 0.1999\%$$

TABLE 3

Results of an exemplary test for obtaining an IVT turn ratio

| Test Results | | Calculated Parameter |
|---|---|---|
| $V_{S1}$ (V) | $V_{HV}$ (V) | $TR_{IVT}$ |
| 10 | 2115.95 | 0.004726 |

TABLE 4

Results of an exemplary test for obtaining a CVD voltage ratio

| Test Results | | Calculated Parameters | |
|---|---|---|---|
| $V_{P2}$ (V) | $V_{S2}$ (V) | $VR_{CVT}$ | $VR_{CVD}$ |
| 2200 | 1.045 | 0.0004749 | 0.1005 |

Exemplary results clearly reveal that the estimated dissipation factor, i.e., $\tan\delta_{CVD}$, very well agrees with an actual value of the dissipation factor. Implementations of method 100 were also examined for CVTs with a rated voltage of about 63 kV and 400 kV, and again well agreement between the estimated dissipation factors of CVD and the corresponding actual values was obtained for these case studies.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

What is claimed is:

1. A method for measuring a dissipation factor of a capacitor voltage divider (CVD) of a capacitor voltage transformer (CVT), the CVT comprising the CVD, an intermediate voltage transformer (IVT), and a compensating reactor (CR) connected between the CVD and the IVT, the method comprising:

measuring, utilizing a current sensor, a grounded specimen test (GST) mode current passing through a first capacitor of the CVD by coupling the current sensor in series with the first capacitor;

measuring, utilizing the current sensor, an ungrounded specimen test (UST) mode current passing through a second capacitor of the CVD by coupling the current sensor in series with the second capacitor;

obtaining, utilizing one or more processors, a GST mode capacitance and a GST mode dissipation factor from the GST mode current;

obtaining, utilizing the one or more processors, a UST mode capacitance and a UST mode dissipation factor from the UST mode current; and calculating, utilizing the one or more processors, the dissipation factor of the CVD according to an operation defined by the following:

$$\tan\delta_{CVD} = \frac{C_{GST} \times \tan\delta_{GST} + a \times C_{UST} \times \tan\delta_{UST}}{C_{GST} + a \times C_{UST}}$$

where:
tan $\delta_{CVD}$ is the dissipation factor of the CVD,
$C_{GST}$ is the GST mode capacitance,
tan $\delta_{GST}$ is the GST mode dissipation factor,
a is a capacitance ratio defined by a=$C_1/C_2$ where $C_1$ is a capacitance of the first capacitor and $C_2$ is a capacitance of the second capacitor,
$C_{UST}$ is the UST mode capacitance, and
tan $\delta_{UST}$ is the UST mode dissipation factor.

2. A method for measuring a dissipation factor of a capacitor voltage divider (CVD) of a capacitor voltage transformer (CVT), the CVT comprising the CVD, an intermediate voltage transformer (IVT), and a compensating reactor (CR) connected between the CVD and the IVT, the method comprising:

measuring, utilizing a current sensor, a grounded specimen test (GST) mode current passing through a first capacitor of the CVD by coupling the current sensor in series with the first capacitor, measuring the GST mode current comprising:
coupling a high voltage terminal of the first capacitor to an AC voltage source;
connecting the current sensor between the AC voltage source and a ground node;
connecting a low voltage terminal of a second capacitor of the CVD to the ground node; and
recording a phasor value of the GST mode current at the current sensor;

measuring, utilizing the current sensor, an ungrounded specimen test (UST) mode current passing through the second capacitor by coupling the current sensor in series with the second capacitor; and obtaining, utilizing one or more processors, the dissipation factor of the CVD based on the GST mode current and the UST mode current.

3. The method of claim 2, wherein measuring the UST mode current comprises:
connecting the AC voltage source between the high voltage terminal and the ground node;
decoupling the low voltage terminal from the ground node;
connecting the current sensor between the low voltage terminal and the ground node; and
recording, a phasor value of the UST mode current at the current sensor.

4. The method of claim 3, wherein obtaining the dissipation factor of the CVD comprises:
obtaining a GST mode capacitance and a GST mode dissipation factor from the GST mode current;
obtaining a UST mode capacitance and a UST mode dissipation factor from the UST mode current; and
calculating the dissipation factor of the CVD according to an operation defined by the following:

$$\tan\delta_{CVD} = \frac{C_{GST} \times \tan\delta_{GST} + a \times C_{UST} \times \tan\delta_{UST}}{C_{GST} + a \times C_{UST}}$$

where:
tan $\delta_{CVD}$ is the dissipation factor of the CVD,
$C_{GST}$ is the GST mode capacitance,
tan $\delta_{GST}$ is the GST mode dissipation factor,
a is a capacitance ratio defined by a=$C_1/C_2$ where $C_1$ is a capacitance of the first capacitor and $C_2$ is a capacitance of the second capacitor,
$C_{UST}$ is the UST mode capacitance, and
tan $\delta_{UST}$ is the UST mode dissipation factor.

5. The method of claim 4, wherein obtaining the GST mode capacitance and the GST mode dissipation factor comprises:
measuring, utilizing a voltage sensor, a voltage $V_p$ between the high voltage terminal and the low voltage terminal;
calculating the GST mode capacitance according to an operation defined by the following:

$$C_{GST} = \frac{IC_{GST}}{\omega \times V_p}$$

where:
$C_{GST}$ is the GST mode capacitance,
$IC_{GST}$ is an imaginary part of the GST mode current, and
$\omega$ is an angular frequency of the voltage $V_p$; and
calculating the GST mode dissipation factor according to an operation defined by the following:

$$\tan\delta_{GST} = \frac{IR_{GST}}{IC_{GST}}$$

where:
tan $\delta_{GST}$ is the GST mode dissipation factor, and
$IR_{GST}$ is a real part of the GST mode current.

6. The method of claim 4, wherein obtaining the UST mode capacitance and the UST mode dissipation factor comprises:
measuring, utilizing a voltage sensor, a voltage $V_p$ between the high voltage terminal and the low voltage terminal;
calculating the UST mode capacitance according to an operation defined by the following:

$$C_{UST} = \frac{IC_{UST}}{\omega \times V_p}$$

where:
- $C_{UST}$ is the UST mode capacitance,
- $IC_{UST}$ is an imaginary part of the UST mode current, and
- $\omega$ is an angular frequency of the voltage $V_p$; and
calculating the UST mode dissipation factor according to an operation defined by the following:

$$\tan\delta_{UST} = \frac{IR_{UST}}{IC_{UST}}$$

where:
- $\tan\delta_{UST}$ is the UST mode dissipation factor, and
- $IR_{UST}$ is a real part of the UST mode current.

7. The method of claim 4, further comprising:
obtaining a turn ratio of the IVT;
obtaining a voltage ratio of the CVT; and
calculating, utilizing the one or more processors, the capacitance ratio according to an operation defined by the following:

$$a = \frac{VR_{CVT}}{TR_{IVT} - VR_{CVT}}$$

where $VR_{CVT}$ is the voltage ratio and $TR_{IVT}$ is the turn ratio.

8. The method of claim 7, wherein obtaining the turn ratio comprises:
disconnecting the AC voltage source and the current sensor from the CVD;
connecting the high voltage terminal to the low voltage terminal;
applying an AC test voltage $V_{S1}$ across terminals of secondary windings of the IVT;
measuring, utilizing a voltage sensor, a high voltage (HV)-side $V_{HV}$ of the IVT across the low voltage terminal and the ground node; and
calculating, utilizing the one or more processors, the turn ratio according to an operation defined by $$TR_{IVT} = \frac{V_{S1}}{V_{HV}}.$$

9. The method of claim 7, wherein obtaining the voltage ratio comprises:
disconnecting the AC voltage source and the current sensor from the CVD;
connecting the low voltage terminal to the ground node;
applying an AC test voltage $V_{P2}$ to the high voltage terminal;
measuring, utilizing a voltage sensor, a secondary voltage $V_{S2}$ across terminals of secondary windings of the IVT; and
calculating, utilizing the one or more processors, the voltage ratio according to an operation defined by $$VR_{CVT} = \frac{V_{S2}}{V_{P2}}.$$

10. The method of claim 3, wherein obtaining the dissipation factor of the CVD comprises calculating the dissipation factor of the CVD according to an operation defined by the following:

$$\tan\delta_{CVD} = \frac{IR_{GST} + a \times IR_{UST}}{IC_{GST} + a \times IC_{UST}}$$

where:
- $\tan\delta_{CVD}$ is the dissipation factor of the CVD,
- $IR_{GST}$ is a real part of the GST mode current,
- $IR_{UST}$ is a real part of the UST mode current,
- $a$ is a capacitance ratio defined by $a = C_1/C_2$ where $C_1$ is a capacitance of the first capacitor and $C_2$ is a capacitance of the second capacitor,
- $IC_{GST}$ is an imaginary part of the GST mode current, and
- $IC_{UST}$ is an imaginary part of the UST mode current.

11. The method of claim 10, further comprising:
obtaining a turn ratio of the IVT;
obtaining a voltage ratio of the CVT; and
calculating, utilizing the one or more processors, the capacitance ratio according to an operation defined by the following:

$$a = \frac{VR_{CVT}}{TR_{IVT} - VR_{CVT}}$$

where $VR_{CVT}$ is the voltage ratio and $TR_{IVT}$ is the turn ratio.

12. The method of claim 11, wherein obtaining the turn ratio comprises:
disconnecting the AC voltage source and the current sensor from the CVD;
connecting the high voltage terminal to the low voltage terminal;
applying an AC test voltage $V_{S1}$ across terminals of secondary windings of the IVT;
measuring, utilizing a voltage sensor, a low voltage $V_L$ of the CVD at the low voltage terminal; and
calculating, utilizing the one or more processors, the turn ratio according to an operation defined by $$TR_{IVT} = \frac{V_{S1}}{V_L}.$$

13. The method of claim 11, wherein obtaining the voltage ratio comprises:
disconnecting the AC voltage source and the current sensor from the CVD;
connecting the low voltage terminal to the ground node;
applying an AC test voltage $V_{P2}$ to the high voltage terminal;
measuring, utilizing a voltage sensor, a secondary voltage $V_{S2}$ across terminals of secondary windings of the IVT; and
calculating, utilizing the one or more processors, the voltage ratio according to an operation defined by $$VR_{CVT} = \frac{V_{S2}}{V_{P2}}.$$

* * * * *